June 22, 1965 P. L. TWEDT ETAL 3,190,328
EGG BREAKING HEAD
Filed Oct. 29, 1962 4 Sheets-Sheet 1
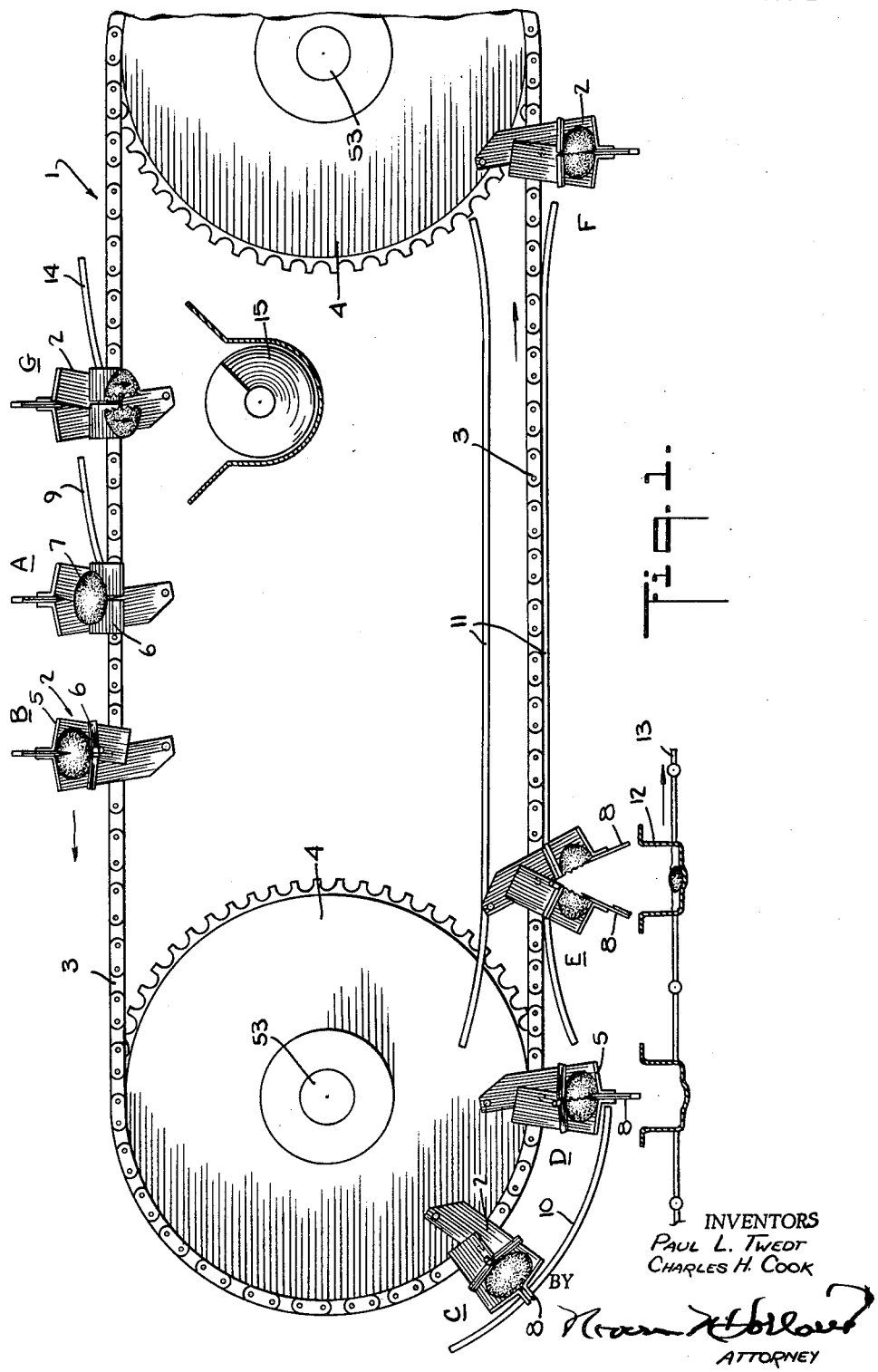
INVENTORS
PAUL L. TWEDT
CHARLES H. COOK
BY
ATTORNEY

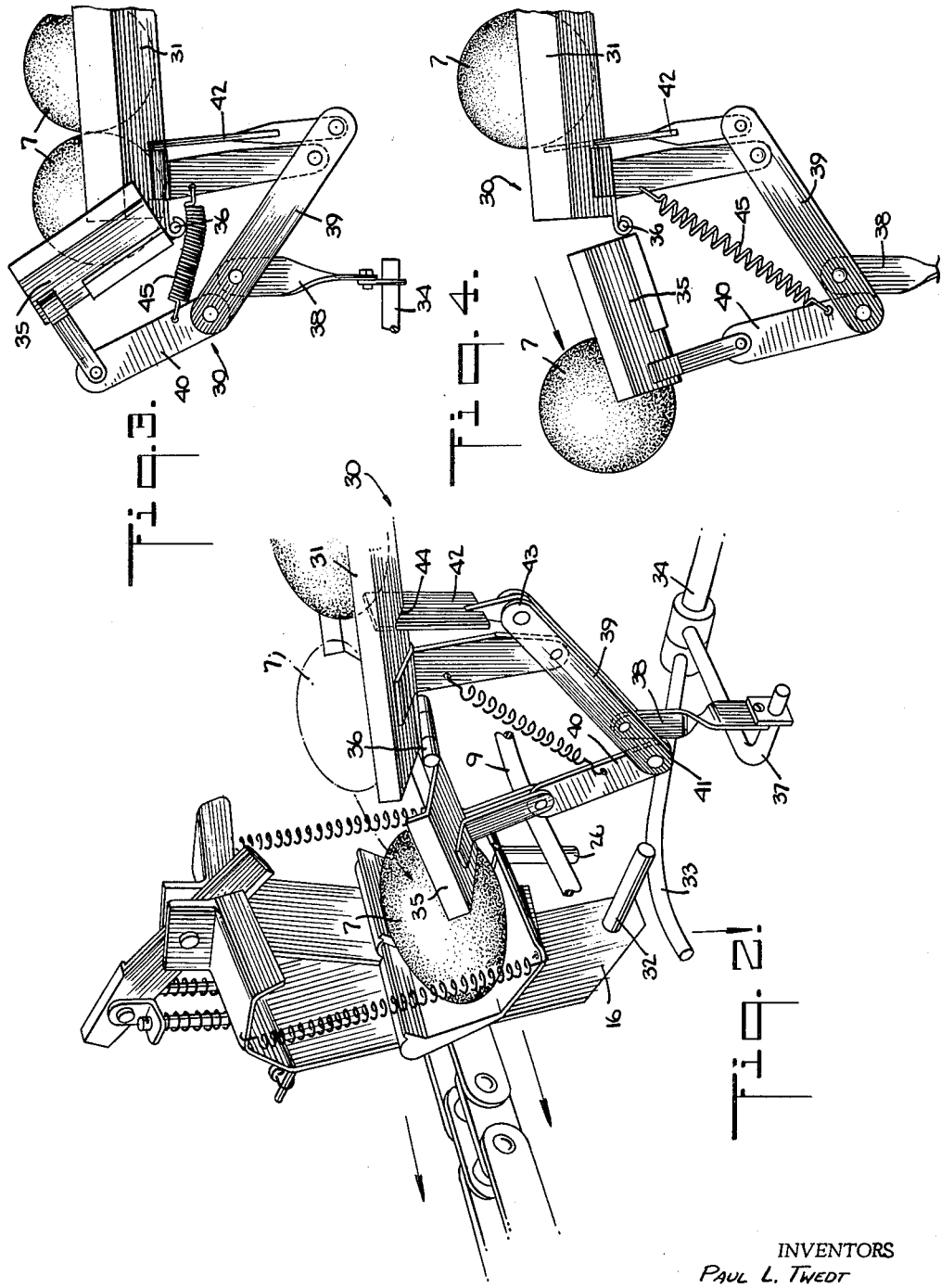

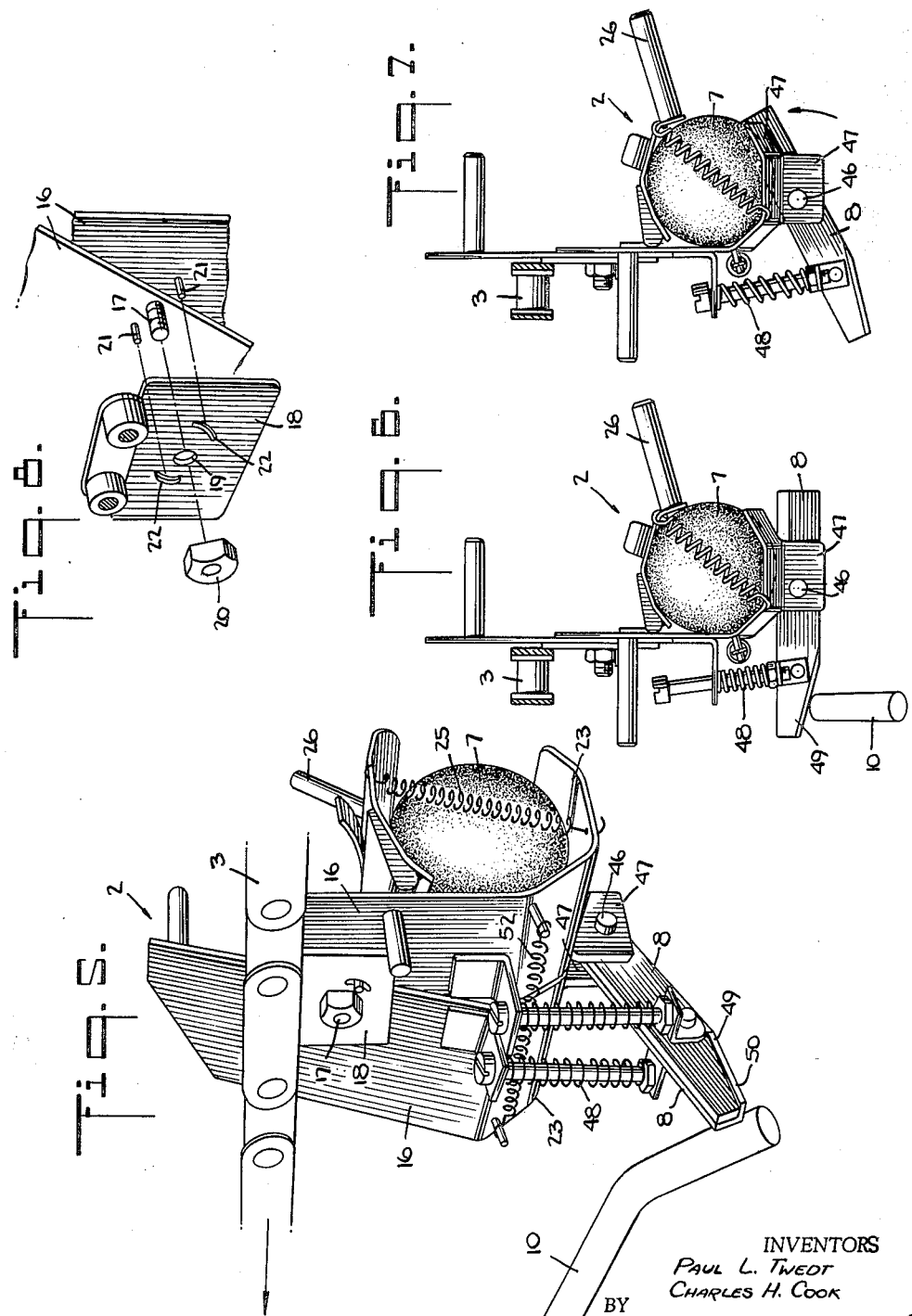

June 22, 1965   P. L. TWEDT ETAL   3,190,328
EGG BREAKING HEAD
Filed Oct. 29, 1962   4 Sheets-Sheet 4
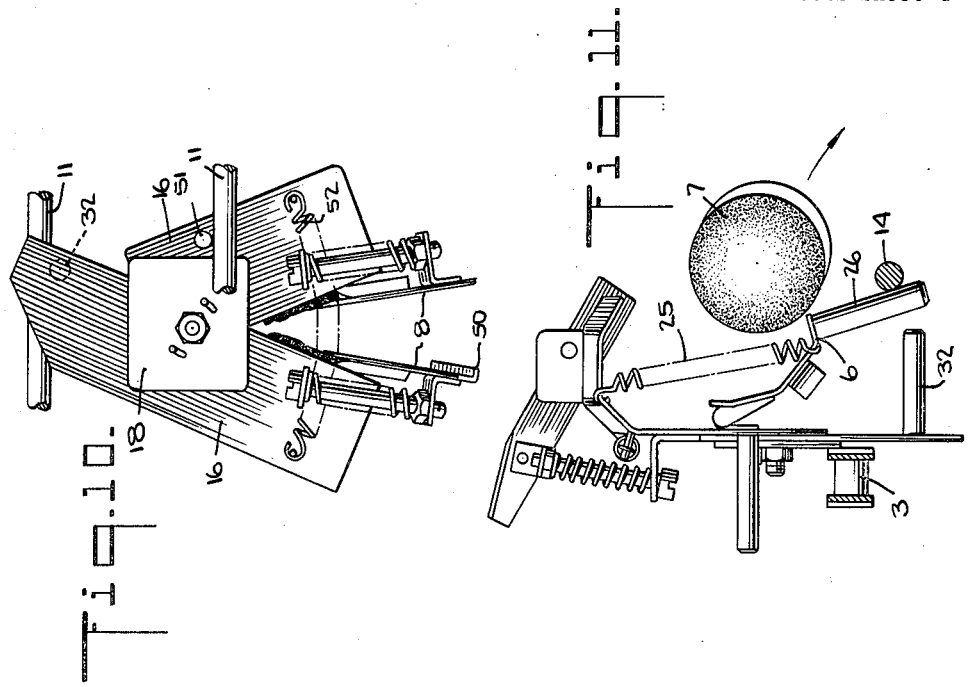
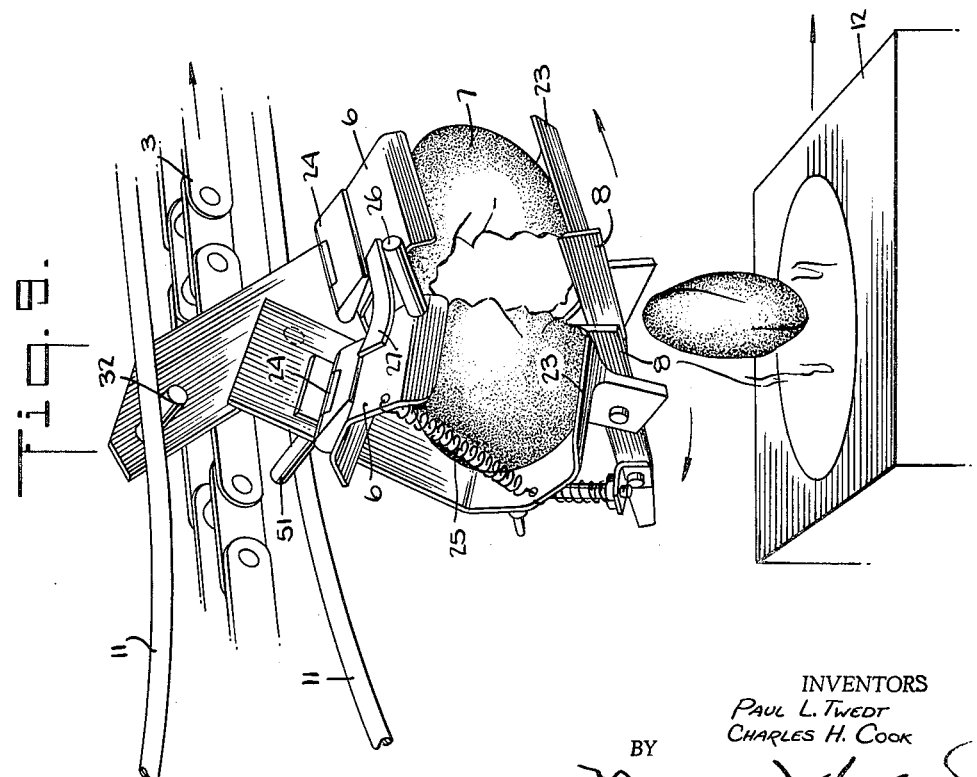
INVENTORS
PAUL L. TWEDT
CHARLES H. COOK
BY
ATTORNEY

United States Patent Office 3,190,328
Patented June 22, 1965

3,190,328
EGG BREAKING HEAD
Paul L. Twedt and Charles H. Cook, Springfield, Mo., assignors to Henningsen Foods, Inc., a corporation of Texas
Filed Oct. 29, 1962, Ser. No. 233,837
10 Claims. (Cl. 146—2)

The present invention relates to an improved high speed automatic machine and method for breaking eggs to remove the liquid yolk and albumen.

Egg breaking machines have been in use for sometime in food processing plants wherein liquid egg yolk and albumen are removed from the eggs. For example, large quantities of such liquid egg products are subjected to further processing such as the preparation of powdered or frozen egg products.

A continuing increase in the demand for egg products and particularly an increased use of powdered and frozen egg products provides a need for machinery of this type with extremely high capacity, with efficient shell drainage, and gentle egg handling. While there are several types of machines which are now used for this operation, it has been found impractical to adapt these present machines and methods for the higher and more efficient operating speeds necessary to effectively furnish the desired volume of such egg products. The operation of present machines at high speeds has resulted in an unacceptable egg breakage rate and a loss of efficiency in shell drainage. Attempts to increase the output through the duplication of present machines have required the use of an undesirably large factory area and have required large investments in machinery. Attempts to increase output by the duplication or addition of machines has also reduced efficiency by requiring the operator to feed and supervise an inefficient and unduly complex machine layout.

Accordingly, an object of the present invention is to provide a new method and machine for practicing the method which permit a high speed egg breaking operation to be carried out in a confined space with gentle egg handling, with efficient shell drainage, and with a minimum of supervision. This object has been obtained with the machine and method of the present invention by a new concept of egg handling and breaking wherein an extensive increase in egg handling capability may be readily incorporated into the system with only minor additions to the basic machine and with the absolute retention of the improved egg handling and efficient shell draining capabilities.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a side elevational view illustrating a preferred embodiment of the machine of the present invention;

FIG. 2 is an enlarged perspective view illustrating the egg feeding gate and an egg breaking unit at the egg feeding position;

FIG. 3 is an enlarged detailed elevational view of the egg feeding gate in closed position;

FIG. 4 is similar to FIG. 3 and illustrates the gate of FIG. 3 in its open position;

FIG. 5 is an enlarged perspective view illustrating the rear portion of an egg breaking unit holding an egg;

FIG. 6 is a detailed end elevational view of an egg breaking unit at the knife cocking position;

FIG. 7 is a similar view of an egg breaking unit at the shell cracking position;

FIG. 8 is an exploded perspective view of the means for mounting the egg breaking units on the roller chain;

FIG. 9 is an enlarged perspective view of an egg breaking head at the egg dumping position;

FIG. 10 is a rear elevational view of an egg breaking unit at the egg dumping position illustrating the action of the dumping cams in opening the egg breaking head; and FIG. 11 is an end elevational view of an egg breaking unit at the shell dumping station.

The apparatus and method of the present invention will be first described generally with particular reference to FIG. 1 which illustrates the movement of an egg breaking unit through the various stations of a preferred embodiment of the egg breaking head 1. As seen in FIG. 1, a number of egg breaking units 2 are mounted on an endless conveyor which preferably is the roller chain 3. The roller chain 3 is mounted on a pair of spaced sprocket wheels 4 so that relatively long upper and lower runs are provided through which the egg breaking units 2 are moved and during which most of the various operations on the eggs are performed.

As will be more fully described below, the egg breaking units 2 have an egg supporting cup 5 and spaced egg holding plates 6 which resiliently engage an egg 7 during the various automatic operations. The egg breaking unit 2 illustrated at station A in FIG. 1 is at the egg loading station wherein an egg 7 is fed into the egg breaking unit 2 while the egg holding plates 6 are held in an open position by cam 9. The egg breaking unit 2 continues to move forward on the roller chain while the egg holding plates 6 close to resiliently grip the egg 7 and to carry the egg 7 to the succeeding stations. A pair of egg cracking knives 8 are provided on each egg breaking unit 2 and when the egg breaking unit 2 reaches the position illustrated at station C, a suitable cam 10 moves these knives 8 to a cocked position. Further movement of the egg breaking unit 2 on the roller chain 3 carries the egg breaking unit 2 to position D where the cocked knives 8 are released so that they penetrate and crack the egg shell so that the shell is split in two halves. The egg breaking unit 2 now moves to the dumping station E where a scissor-like mounting for the two halves of the egg breaking head 1 is opened by cams 11 to separate the two egg halves with each half tilted so that the egg albumen and yolk flow into a cup 12 beneath the broken egg 7. The cup 12 is mounted on a suitable conveyor 13 so that one cup 12 moves beneath each moving egg breaking unit 2 in position to receive the egg yolk and albumen as they flow down from the broken egg 7. These cups are carried by their conveyor to a suitable transfer means or egg separating machine as desired.

As each egg breaking unit 2 passes beyond the dumping station E, the two halves of the egg breaking unit 2 are returned to their closed position as illustrated at F and the egg breaking unit 2 then carries the empty egg shell around to a shell dumping station G where the egg holding plates 6 are again opened by a suitable cam 14 to permit the broken shell to drop into a shell disposal means such as the spiral conveyor 15.

The details of the egg breaking units and their operation on the egg breaking head 1 will now be described. FIG. 5 shows an egg breaking unit 2 mounted on the roller chain 3 with an egg 7 resiliently held therein. As clarly seen in this figure, each egg breaking unit 2 comprises a pair of scissor-like mounting members or blades 16 pivotally connected together by a pivot 17 and with the blades 16 attached by means of the pivot 17 to a mounting plate 18 which is welded or otherwise attached to a link of the roller chain 3.

As illustrated in detail in FIG. 8, the pivot 17 is accommodated in a suitable aperture 19 in the mounting plate 18 and is held in position by a nut 20. A guide pin 21 on each of the two mounting blades 16 is slidably accommodated by a guide slot 22 in the plate 18. It will be seen that this mounting firmly attaches each of the egg breaking units 2 to the roller chain 3 while at the same time permitting a scissor-like opening of the mounting blades 16 for the egg breaking and dumping operations as will now be described.

The egg holding means for each of the egg breaking units 2 comprises a rounded breaking cup 5 preferably formed by integral end portions 23 of the mounting blades 16. An egg holding plate 6 is mounted above each end portion 23 so that the egg holding plates 6 and the breaking cup 5 cooperate to resiliently support the egg 7 in the egg breaking unit 2. Each of the egg holding plates 6 is pivotally attached by hinge 24 (FIG. 9) to one of the mounting blades 16 and a coil spring 25 releasably holds each of the egg holding plates 6 in its closed or egg gripping position as illustrated in FIG. 5.

FIG. 2 shows an egg breaking unit 2 at the egg loading station A. For purposes of this description, the egg breaking unit 2 while in this position, will be designated as being in an inverted position with the breaking knives 8 uppermost and as contrasted with the upright position of the breaking units 2 at the egg breaking and dumping stations D and E as illustrated in FIGS. 1 and 5. The inverted egg breaking unit 2 in FIG. 2 is in the egg receiving position with both of the egg holding plates 6 swung downwardly to their open position. The plates 6 are moved to this position against the force of coil springs 25 by means of a cam following pin 26 on one of the egg holding plates 6 which has been engaged and swung downwardly by an elongated stationary cam 9 fixedly mounted adjacent the path of the moving egg breaking units 2. The two egg holding plates 6 are opened simultaneously through the intermediation of a lug 27 on the second egg holding plate as best illustrated in FIG. 9. When the pin 26 opens its attached egg holding plate 6, the lug 27 causes the second plate 6 to follow.

A preferred embodiment of the egg loading means which feeds eggs 7 to the opened egg breaking units 2 is illustrated in FIGS. 2–4. The loader 30 comprises an inclined chute 31 positioned adjacent to the opening cam 9 so that the endmost egg 7 in the chute 31 is held adjacent to the open egg breaking unit as it nears the end of chute 31. As the egg breaking unit 2 is carried past the chute 31 in the inverted position as illustrated in FIG. 2, a loading pin 32 on the outer end of one of the mounting blades 16 strikes and rotates a loading lever 33 mounted at the end of a rotatably mounted shaft 34. This shaft 34 is operatively connected to a gate 35 pivotally attached at 36 to the end of the chute 31 so that rotation of the loading lever 33 lowers the gate 35 and permits the endmost egg 7 to roll into the egg breaking unit 2. The connection between cam lever 33 and the gate 35 comprises a connecting rod 37, a link member 38 connecting the rod 37 to a pivotally mounted lever 39 and a second link member 40 pivotally attached between the lever 39 and the gate 35. Thus, as illustrated in FIG. 2, counterclockwise rotation of the loading lever 33 causes a corresponding movement of the connecting rod 37 and a downward motion of the links 38 and 40 and the end 41 of the lever 39. This causes the gate 35 to swing downwardly so that it forms an inclined continuation of the egg feeding chute 31 to release and guide the end egg 7 into the open egg breaking unit 2.

In order to retain the second egg in the chute 31, a latch 42 is pivotally mounted on the opposite end 43 of the lever 39 so that the lowering of the gate 35 causes a simultaneous upward movement of the latch 42 through a suitable slot 44 in the chute 31 to temporarily retain the second egg 7 in the chute 31. After the egg breaking unit 2 moves beyond the loading lever 33, the lever 33 is returned to its normal raised position under the force of the coil spring 45 so that the gate 35 is again raised to confine the endmost egg 7 as it rolls against the gate 35 as upward movement of the gate 35 again lowers the latch member 42.

The egg breaking unit 2 is now carried on to the knife cocking station C with an egg 7 gripped between the spaced breaking cup 5 and egg holding plates 6.

FIG. 5 illustrates an egg breaking unit 2 approaching the knife cocking position C. As best illustrated in FIGS. 2 and 5, an egg cracking knife means is provided on each egg breaking unit preferably comprising a pair of adjacent knives 8 one of which is pivotally attached at 46 to each of the mounting flanges 47 provided on the facing edges of the two portions 23 of the egg breaking cup 5. This pair of knives 8 is adapted to be swung as a unit from a cocked position outwardly of the egg breaking cup as illustrated in FIG. 6 to a cracking position within the cup 5 by the combined action of a pair of springs 48 coupled to the ends 49 of the knives 8 and the cocking cam 10 positioned to engage the same end 49 of the knives to compress springs 48.

FIG. 5 shows the egg breaking unit 2 approaching the knife cocking cam 10 which engages the outer ends 49 of the knives 8 and swings them outwardly of the egg breaking cup 5 to the cocked position illustrated in FIG. 6 and against the force of the compressed coil springs 48. Further forward movement of the egg breaking unit 2 on chain 3 causes the knives 8 to abruptly clear the end of the cam 10 so that both knives 8 snap inwardly through the egg shell under the force of the coil springs 48 to the position illustrated in FIG. 7. This simultaneous inward snapping of the knives 8 cracks the egg shell with a sharp breaking action which forms a generally circular fracture around all or a substantial portion of the circumference of the egg shell.

To facilitate the above described simultaneous cocking of both knives 8, a flange 50 is preferably formed on one knife so that the flange rides on the cocking cam 10 and also engages the opposite knife 8 to cause the two knives 8 to swing open as a unit.

The egg breaking uint 2 is now carried to the egg dumping station E where the egg breaking unit 2 is swung open as illustrated in FIGS. 9 and 10 so that the egg albumen and yoke are dumped into a suitable receptable such as the cup 12 which is being moved in synchronism with the moving egg breaking unit 2 by a suitable conveyor 13.

As described above, the egg holding means on each egg breaking unit 2 is formed of generally similar cup portions 23 and egg holding plates 6 with one of each being attached to each blade 16 of the pair of pivotally connected mounting blades 16. At the egg dumping station E, the mounting blades 16 are swung apart about the pivot 17 to separate and to tilt each of the egg shell halves permitting the liquid yoke and albumen to flow or drop downwardly from the egg shell into the cup 12.

Since a knife 8 is attached to each half of the egg breaking cup 5, the knives 8 are also swung out during the dumping operation and the knives act to hold the two halves of the egg shell in position on the breaking cups. Since each knife 8 has an upwardly inclined position, as illustrated in FIG. 7 which exposes the lowermost portion of each half of the egg shell, the knives 8 do not interfere with the downward flow of the liquid egg and efficient shell drainage is achieved at the dumping station E. A pair of opening cams 11 are used to swing the mounting plates 16 to their open position at the dumping station E. One cam 11 engages the loading pin 32 on one mounting blade 16 while the opposite cam 11 engages a similar pin 51 on the other mounting blade 16 and the movement of the pins 32 and 51 towards one another by the cams 11 results in a scissor-like opening of the two mounting blades 16 and the attached egg holding plates 6 and breaking cup portions 23. The two mounting blades 16 are swung open against the force of a closing spring 52 which acts to return the plates to thir normal closed positon at the completion of the dumping operation as the egg breaking unit 2 moves beyond the egg dumping station E.

The moving roller chain 3 now carries the empty shell in the egg breaking unit 2 around to the shell dumping station G. At this station, a suitably positioned opening cam 14 engages the cam pin 26 to swing the egg holding plates 6 of the inverted egg breaking unit 2 downwardly permitting the egg shells to drop into an egg shell removal conveyor, such as the spiral conveyor 15 illustrated in FIG. 1.

For clarity of description and illustration, a single roller chain 3 is shown in FIG. 1 mounted on spaced sprockets 4 and a limited number of breaking units 2 are shown on chain 3. It is clear that additional sprockets 4 and roller chains 3 with related egg breaking units 2 and loaders 30 may be mounted on the spaced mounting shafts 53 to provide additional capacity and that additional breaking units 2 may be used on the chain 3 illustrated.

Due to the novel breaking apparatus and method described above, it will be seen that additional chains 3 and breaking units 2 may be conveniently added in the necessary numbers with only moderately increased space requirements and without unduly complicating the over-all system or the necessary operations and observations of the machine operator. The relatively long upper run of each chain as illustrated in the preferred embodiment permits a convenient spacing of the egg loading chutes for the various chains since the egg breaking units 2 may be loaded at differing positions between the shell dumping station G, and the end sprocket 4 beyond the dumping station. The elongated lower run of the chain 3 provides for a relatively long and efficient shell drainage. By providing a machine wherein duplication and multiplication of the individual elements is practical and convenient, increased over-all machine output is easily obtained when needed by increasing the number of breaking head units instead of by merely raising the machine operating speed. This, together with the improved breaking unit disclosed, permits the retention of a relatively low handling speed for individual eggs with consequent low egg handling forces while achieving an extremely high over-all egg breaking capacity.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

What is claimed is:

1. An improved egg breaking unit for mounting on a moving chain comprising a mounting plate adapted for attachment to a link of the chain having a pivot thereon, a pair of mounting blades pivotally connected to each other and to said mounting plate by said pivot, an egg supporting cup portion at adjacent ends of each of said blades, an egg holding member pivotally connected to each blade in spaced relation to said cup portions, and knife means pivotally connected to at least one of said blades for cutting the shell of an egg held between said cup portions and said egg holding members.

2. An improved egg breaking unit for mounting on a moving chain comprising a mounting plate adapted for attachment to a link of the chain having a pivot thereon, a pair of mounting blades pivotally connected to each other and to said mounting plate by said pivot, an egg supporting cup portion at adjacent ends of each of said blades, resilient means holding said cup portions together, an egg holding plate pivotally connected to each blade in spaced relation to said cup portions, knife means pivotally connected to one of said blades for cutting the shell of an egg held between said cup portion and said holding plates, and cam engaging pins on each of said blades for engaging spaced cams to move said cup portions apart against the force of said resilient means.

3. In an egg breaking machine the combination of an endless chain, an egg breaking unit comprising a mounting plate connected to a link of said chain and having a pivot thereon, a pair of mounting blades pivotally connected to each other and to said mounting member by said pivot, an egg supporting cup portion at adjacent ends of each of said blades, an egg holding plate pivotally connected to each blade in spaced relation to said cup portions, and knife means pivotally connected to one of said blades for cutting the shell of an egg held between said cup portions and said holding plates.

4. An egg breaking machine comprising a pair of spaced sprockets, a chain mounted on said sprockets having substantially horizontal and spaced elongated upper and lower runs, means for continuously moving said chain, a plurality of egg breaking units mounted on said chain for movement therewith, chute means for feeding an egg to each of said moving breaking units, knife means movably mounted on each of said breaking units for cracking the egg shells, a stationary cam adjacent to the path of said chain for moving said knife means to a cocked position and for thereafter releasing said knife means to crack the egg shells, said egg breaking units comprising a mounting plate having a pivot thereon, a pair of mounting blades pivotally connected to each other by said pivot, an egg supporting cup portion at adjacent ends of each of said blades, an egg holding member pivotally connected to each blade in spaced relation to said cup portions, said knife means being pivotally connected to at least one of said blades and being positioned for cutting the central portion of the shell of an egg held between said cup portions and said egg holding members, and an elongated stationary cam adjacent the path of the lower run of said chain for opening said breaking units to drain the eggs along a substantial portion of said lower run, means for thereafter removing the egg shells from the breaking uints.

5. An egg breaking machine comprising a pair of spaced sprockets, a chain mounted on said sprockets having substantially horizontal and spaced elongated upper and lower runs, means for continously moving said chain, a plurality of egg breaking units mounted on said chain for movement therewith, chute means for feeding an egg to each of said moving breaking units, a gate on said chute means, means on each of said egg breaking units for opening said gate, knife means movably mounted on each of said breaking units for cracking the egg shells, a stationary cam adjacent to the path of said chain for moving said knife means to a cocked position and for thereafter releasing said knife means to crack the egg shells, said egg breaking units comprising a mounting plate having a pivot thereon, a pair of mounting blades pivotally connected to each other and to said mounting plate by said pivot, an egg supporting cup portion at adjacent ends of each of said blades, an egg holding member pivotally connected to each blade in spaced relation to said cup portions, means adjacent said chute for swinging said holding members away from said cup portions, said knife means being pivotally connected to at least one of said blades and being positioned for cutting the central portion of the shell of an egg held between said cup portions and said egg holding members, and an elongated stationary cam adjacent the path of the lower run of said chain for opening said breaking units by turning one of said blades about said pivot to drain the eggs along a substantial portion of said lower run, means for thereafter removing the egg shells from the breaking units.

6. An improved egg breaking unit for mounting on a moving chain comprising a mounting plate adapted for attachment to a link of the chain, a pair of mounting blades connected to said mounting plate and pivotally connected to one another, an egg supporting cup portion at adjacent ends of each of said blades, resilient means holding said cup portions together, an egg holding plate pivotally connected to each blade in spaced relation to said cup portions, means for simultaneously swinging said plates away from said cup portions, knife means pivotally connected to one of said blades for cutting the shell of an egg held between said cup portions and said holding plates, and cam engaging means for engaging stationary cams to move said cup portions apart against the force of said resilient means.

7. An egg breaking machine comprising spaced pulleys, an endless belt mounted on said pulleys having substantially horizontal and spaced elongated upper and lower runs, means for continuously moving said belt, a plurality of egg breaking units mounted on said belt for movement therewith, means for feeding an egg to said moving breaking units, knife means on said breaking units for cracking the egg shells, means for moving said knives to crack the egg shells, means for opening said breaking units during their movement on the lower run of said belt for dividing the egg shells to drain the egg shells, means for thereafter removing the egg shells from the breaking units, said egg breaking units comprising a mounting member having a pivot thereon, a pair of mounting blades pivotally connected to each other and to said mounting member by said pivot, an egg supporting cup portion at adjacent ends of each of said blades, an egg holding member pivotally connected to each blade in spaced relation to said cup portions, and said knife means being pivotally connected to at least one of said cup portions for cutting the shell of an egg held between said cup portions and said egg holding members.

8. The machine as claimed in claim 7 wherein said egg feeding means comprises an inclined chute, a gate at the lower end of said chute, means for opening said gate comprising an opening member operatively coupled to said gate and positioned for engagement with said moving egg breaking units.

9. An egg breaking machine comprising spaced sprockets, a chain mounted on said sprockets having substantially horizontal and spaced upper and lower runs, means for continuously moving said chain, a plurality of egg breaking units mounted on said chain for movement therewith, means for feeding an egg to each of said moving breaking units, knife means movably mounted on each of said breaking units for cracking the egg shells, stationary cam means adjacent the path of said chain for moving said knives to a cocked position and for releasing said knives to crack the egg shells, elongated stationary cam means adjacent the path of the lower run of said chain for opening said breaking units to drain the eggs along a substantial portion of said lower run, and means for thereafter removing the egg shells from the breaking units, said egg breaking units comprising a mounting member having a pivot thereon, a pair of mounting blades pivotally connected to each other and to said mounting member by said pivot, an egg supporting cup portion at adjacent ends of each of said blades, an egg holding member pivotally connected to each blade in spaced relation to said cup portions, and said knife means pivotally connected to at least one of said cup portions for cutting the shell of an egg held between said cup portions and said egg holding members.

10. The machine as claimed in claim 9 wherein said egg feeding means comprises an inclined chute, a gate at the lower end of said chute, means for opening said gate comprising an opening member operatively coupled to said gate and positioned for engagement with said moving egg breaking units.

References Cited by the Examiner

UNITED STATES PATENTS

| | | |
|---|---|---|
| 1,361,121 | 12/20 | Weiss. |
| 2,160,319 | 5/39 | Swartz _____ 146—2 X |
| 2,524,844 | 10/50 | Smith. |
| 2,966,184 | 12/60 | Willsey. |
| 3,082,804 | 3/63 | Shelton. |

J. SPENCER OVERHOLSER, *Primary Examiner.*